US008125372B2

(12) United States Patent
Focke et al.

(10) Patent No.: US 8,125,372 B2
(45) Date of Patent: Feb. 28, 2012

(54) DRIVER ASSISTANCE SYSTEM AND METHOD FOR CHECKING THE PLAUSIBILITY OF OBJECTS

(75) Inventors: Thomas Focke, Ahrbergen (DE);
Jan-Carsten Becker, Gerlingen (DE);
Joerg Hilsebecher, Hildesheim (DE);
Arne Zender, Bad Salzdetfurth (DE);
Mario Mueller-Frahm, Hannover (DE);
Jans Sparbert, Renningen (DE);
Thomas Schoeberl, Hildesheim (DE);
Fred Oechsle, Ludwigsburg (DE);
Andreas Grimm, Tiefenbronn-Muehlhausen (DE);
Andreas Simon, Wolfenbuttel (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/305,432

(22) PCT Filed: Mar. 3, 2008

(86) PCT No.: PCT/EP2008/052562
§ 371 (c)(1),
(2), (4) Date: Dec. 4, 2009

(87) PCT Pub. No.: WO2008/128814
PCT Pub. Date: Oct. 30, 2008

(65) Prior Publication Data
US 2010/0085238 A1    Apr. 8, 2010

(30) Foreign Application Priority Data

Apr. 19, 2007    (DE) ................. 10 2007 018 470

(51) Int. Cl.
*G01S 13/93*    (2006.01)
(52) U.S. Cl. ............... 342/70; 342/52; 342/54; 342/55; 342/109; 342/128

(58) Field of Classification Search .............. 342/70–72, 342/52, 54–55, 27, 109, 128
See application file for complete search history.

(56) References Cited

U.S. PATENT DOCUMENTS

| 4,860,216 | A  | * | 8/1989  | Linsenmayer ................ 342/159 |
|-----------|----|---|---------|--------------------------------------|
| 6,580,385 | B1 | * | 6/2003  | Winner et al. ................... 342/70 |
| 7,254,504 | B2 | * | 8/2007  | Klotz et al. ..................... 702/89 |
| 7,340,380 | B2 | * | 3/2008  | Klotz et al. .................... 702/189 |
| 7,417,580 | B2 | * | 8/2008  | Abe et al. ........................ 342/27 |
| 7,515,066 | B2 | * | 4/2009  | Watanabe ..................... 340/903 |
| 7,777,669 | B2 | * | 8/2010  | Tokoro et al. .................. 342/70 |
| 7,825,849 | B2 | * | 11/2010 | Tsuchida et al. ............... 342/70 |
| 2004/0066285 | A1 |  | 4/2004  | Sekiguchi |
| 2004/0177285 | A1 | * | 9/2004  | Klotz et al. ................... 713/400 |
| 2005/0021201 | A1 | * | 1/2005  | Klotz et al. .................... 701/35 |
| 2005/0062615 | A1 |  | 3/2005  | Braeuchle et al. |
| 2006/0091654 | A1 |  | 5/2006  | De Mersseman et al. |
| 2007/0182528 | A1 | * | 8/2007  | Breed et al. ................... 340/435 |

FOREIGN PATENT DOCUMENTS

DE    10 2004 046 360    3/2006

(Continued)

OTHER PUBLICATIONS

International Search Report, PCT/EP2008/052562 dated Jul. 9, 2008.

*Primary Examiner* — John B Sotomayor
(74) *Attorney, Agent, or Firm* — Kenyon & Kenyon LLP

(57) ABSTRACT

In a method for checking the plausibility of objects in driver assistance systems for motor vehicles is described, two measured variables are derived from position data from two object position-finding systems of the vehicle that operate independently of one another, for an object located by the two position-finding systems, one variable for each position-finding system, these variables representing one and the same physical parameter, and the two measured variables are then checked for consistency, which is characterized by the fact that the parameter is the time to collision of the vehicle with the object, which is calculated in advance.

6 Claims, 4 Drawing Sheets

FOREIGN PATENT DOCUMENTS

| | | | |
|---|---|---|---|
| DE | 102006058308 A1 * | 6/2008 | |
| DE | 102007018470 A1 * | 10/2008 | |
| DE | 102008042640 A1 * | 4/2010 | |
| EP | 1 338 477 | 8/2003 | |
| EP | 1 690 730 | 8/2006 | |
| JP | 10-332820 | 12/1998 | |
| JP | 2005-209690 | 8/2005 | |
| WO | WO 03/031228 | 4/2003 | |
| WO | WO 2005/098782 | 10/2005 | |
| WO | WO 2006/015894 | 2/2006 | |
| WO | WO 2006/100167 | 9/2006 | |

* cited by examiner

DRIVER ASSISTANCE SYSTEM AND METHOD FOR CHECKING THE PLAUSIBILITY OF OBJECTS

CROSS REFERENCE TO RELATED APPLICATION

This application was filed as International Patent Application No. PCT/EP2008/52562 on Mar. 3, 2008 and claims foreign priority benefits of German Patent Application No. 10 2007 018 470.2, filed Apr. 19, 2007.

FIELD OF THE INVENTION

The present invention relates to a method for checking the plausibility of objects in driver assistance systems for motor vehicles, in which two measured variables are derived from position data from two object position-finding systems of the vehicle that operate independently of one another for an object located by the two position-finding systems, one variable for each position-finding system, these variables representing one and the same physical parameter; in this method, the two measured variables are then checked for consistency. The subject matter of the present invention is also a driver assistance system equipped for implementing this method.

BACKGROUND INFORMATION

Examples of driver assistance systems in which example embodiments of the present invention are applicable include so-called predictive safety systems (PSS) and adaptive cruise control (ACC) systems. In both types of driver assistance systems, at least one object position-finding system, e.g., a radar system or a video-based system, is provided for monitoring the surroundings of the vehicle equipped with the assistance system and for locating objects in the surroundings of the vehicle, in particular preceding vehicles and other obstacles.

With a PSS system, a "predictive" calculation is performed on the basis of the position data to calculate whether there will be a collision with an object, and if there is an acute risk of a collision, a warning signal is issued. This warning signal is converted into an audible signal, for example, which should direct the driver's attention to the risk. Systems are also being developed with which the warning signal immediately triggers an automatic intervention into the longitudinal guidance of the vehicle, e.g., emergency braking, to prevent the collision or at least ameliorate its consequences.

However, such systems make very high demands on the accuracy and reliability of the position-finding system because otherwise there may often be faulty deployment, which could in turn constitute a considerable source of risk.

The reliability of the object position-finding may be improved by providing two position-finding systems that operate independently of one another, so that a certain redundancy is achieved.

DE 103 99 943 describes a method that operates using two independent position-finding systems, one of which supplies data optimized for the longitudinal value while the other system supplies data optimized for the lateral value or lateral extent.

One example of a system optimized for the longitudinal value is a radar system, which supplies relatively accurate measured values for the distance and relative speed of an object, but supplies only inaccurate data for the azimuth angle and thus the lateral position of the object even when the radar sensor has a certain angular resolution. Also, using such a sensor, the lateral extent of the object may be determined only very roughly.

One example of a system optimized for the lateral value is a video-based system, e.g., a video camera having the respective electronic image processing system. Such a system is capable of supplying relatively accurate data about the azimuth angle and the lateral extent of an object, but it allows only an inaccurate determination or estimate of the object distance, in particular with monocular systems, and the relative speed may be determined only indirectly by derivation of the inaccurate distance data over time. In the case of a monocular video system, the distance may be estimated only approximately on the basis of the height of the object in the video image in relation to the height of the horizontal line. If necessary, the accuracy may be improved somewhat by a road surface estimate. A binocular video system allows a distance determination by triangulation, but it also yields only relatively inaccurate values, in particular at greater distances.

In the aforementioned document, it is proposed that the position data of the two systems be compared with one another to obtain more accurate and more plausible position data about the objects located. This procedure is known as checking the plausibility of objects. When a presumed object has been located with the help of one of the two systems, it is possible to state with a high probability that it is a real object if the position data are confirmed by the other system.

Through fusion of the position data of the two position-finding systems, the particular weaknesses of these systems may also be compensated to a certain extent. For example, if the system that has been optimized for the longitudinal value locates an object whose lateral position and extent may be given only within relatively wide tolerance limits, then a check may be performed with the help of the system optimized for the lateral value to determine whether this system has located an object within the wide tolerance limits. The system optimized for the lateral value will then in turn be able to give the distance of the object only within relatively great error limits. If the distance measured by the system optimized for the longitudinal value is within these error limits, then the assumption that the objects located by the two systems are the same physical object is plausible and the exact distance and relative speed measured by the system optimized for the longitudinal value may be combined with the precise data about the precise lateral position and lateral extent measured by the system optimized for the lateral value.

However, there remains a bit of uncertainty with regard to the question of whether or not the position data supplied by the two independent systems actually describe the same real object. This is of course true in particular when there are two objects relatively close together or when there is a relatively high object density in general.

DE 10 2004 046 360 describes a PSS system in which the so-called time to collision is calculated in advance for determining the risk of collision, i.e., this is the time that will presumably elapse before collision with the object if there is no change in the dynamic data for the host vehicle and the located object. The PSS system then triggers one or more actions to prevent the collision or to ameliorate the consequences of the collision when the time to collision is below a threshold value provided for the particular action. It is also proposed in this publication that radar-based systems and image processing-based systems may be combined with one another for the object position-finding but it is not explained in greater detail how the data of these systems are to be combined.

WO 2005/098782 describes a method by which, in a video-based system, the time to collision may be calculated from the change in the scale factor of a detected object from one measuring cycle to the next without having to know the object distances exactly at the particular measuring times.

SUMMARY

Example embodiments of the present invention provide a method for checking the plausibility of an object that will allow a more reliable plausibility check of the objects located by the two position-finding systems.

According to example embodiments of the present invention, a method provides that the parameter represented by the two measured variables used for the consistency check is the time to collision of the vehicle with the object, which is calculated in advance.

According to example embodiments of the present invention, a measured variable for the time to collision is first calculated from the position data obtained using each individual object position-finding system, and then these two values for the time to collision, obtained independently of one another, are compared for a plausibility check of the object. If there is sufficient correspondence between these two values, then it may be assumed with a high degree of certainty that the two object position-finding systems have located the same object and have correctly estimated the risk of collision emanating from this object, because it is extremely unlikely that the two systems will supply the same time to collision if the position data of one or both systems are based on a measurement error or an interpretation error.

The method according to example embodiments of the present invention in this manner avoids the uncertainties resulting from the difficulty of correctly assigning the position data obtained for various objects from the two position-finding systems.

For the comparison of the position data of the two position-finding systems, it is thus not necessary to have complex plausibility check algorithms but instead the plausibility check involves simply comparing two numerical values. The plausibility check may therefore be performed with a high reliability and nevertheless in an extremely short period of time, so that valuable time is saved with PSS systems in particular.

Example embodiments of the present invention are advantageous in particular when one of the two object position-finding systems is an FMCW radar (frequency-modulated continuous wave), which is already in use today as a radar object position-finding system in many driver assistance systems. With an FMCW radar, an intermediate frequency signal which indicates the frequency difference between the signal sent and the signal received is generated by mixing the signal reflected by such an object and received again by the sensor with the signal sent by this sensor at the reception time. The time to collision may be determined from this intermediate frequency signal. In this way, one of the two measured variables needed for the consistency check is obtained by a very rapid method, which has a low susceptibility to error.

If the other object position-finding system is a video-based system, a measured variable for the time to collision may be calculated from the change in the scale factor of the object, as is described in WO 2005/098782. On the whole, through very rapid and reliable algorithms, this yields two measured variables for the time to collision, which need only be checked for correspondence.

If multiple objects are located at the same time using the two object position-finding systems, then two measured variables for the time to collision are obtained for each object, and the plausibility of each object may be checked by comparing these measured variables. For a PSS system, the shortest time to collision naturally has by far the highest relevance, so that a warning signal may be issued without any loss of time or an action may be triggered as soon as the smallest measured variables for the time to collision measured by the two object position-finding systems match.

If two measured variables for the time to collision match, then the plausibility of the particular object has been checked at the same time, i.e., it may be assumed that the position data supplied by the two position-finding systems describe the same physical object. These position data may then be fused in such a way that maximum precision and reliability for the position data of the particular object are achieved while utilizing the particular strengths of the two position-finding systems.

In the case of an FMCW radar, the present invention at the same time also solves the problem known as the problem of "spurious objects." The intermediate frequency signal obtained in a single measuring operation for a single object using an FMCW radar depends on the distance of this object as well as the Doppler shift and thus depends on the relative speed of the object, and this therefore does not yield an accurate measured value directly for either the distance or the relative speed but instead merely supplies a relationship between distance and relative speed that must apply to the object in question. To eliminate this ambiguity, the frequency of the radar signal sent is modulated using at least two different frequency ramps in an FMCW radar system. For a given object, a different relationship is then obtained between distance and relative speed for each of the two frequency ramps and the "correct" values for the distance and relative speed are the values at which both relationships are satisfied.

However, it must be assumed that the measured data obtained on the two frequency ramps are actually based on the same object. If multiple objects are located simultaneously, there are different possibilities for identifying the objects measured on the different frequency ramps with each other, and a number of so-called spurious objects, which are simulated by faulty assignment of the radar echoes, are obtained in addition to the "correct" object pairs describing real objects. By using three or more different frequency ramps, the incidence of such spurious objects may be reduced but cannot always be suppressed completely.

With the method according to example embodiments of the present invention, the time to collision, which is obtained independently with the help of the second position-finding system, may now be utilized as an additional criterion for differentiating real objects from spurious objects. The time to collision represents a certain relationship between distance and relative speed for each object, and only in the case of real objects is this relationship consistent with the relationships obtained from the intermediate frequency signals on two frequency ramps. In this manner, example embodiments of the present invention make it possible to differentiate reliably between real objects and spurious objects.

An exemplary embodiment of the present invention is depicted in the drawings and explained in greater detail in the following description.

DETAILED DESCRIPTION

Figure 1:
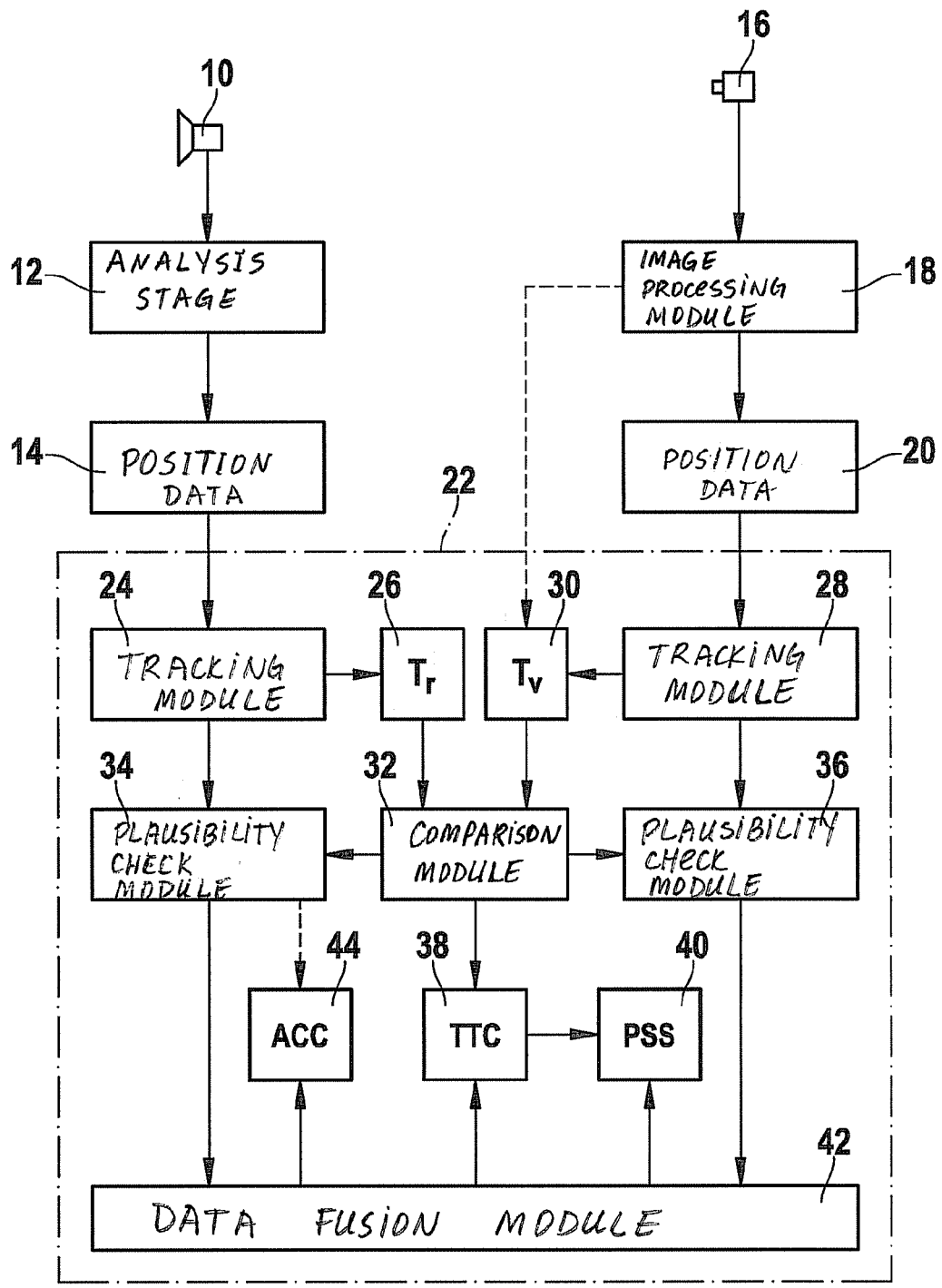
FIG. 1 shows a block diagram of a driver assistance system for implementing the method according to example embodiments of the present invention.

FIG. 1 shows a driver assistance system for a motor vehicle, namely in this example a combination of an adaptive cruise control (ACC) system and a predictive safety system (PSS), shown as a block diagram. This system includes two object position-finding systems that operate independently of one another for detection of the field in front of the vehicle equipped with the driver assistance system.

A first object position-finding system is formed by a radar sensor 10, an FMCW radar in the example shown here. Received radar signals are preprocessed in an analysis stage 12, thus yielding position data 14 for one or more located objects. Each object is described by a set of position data, including the distance, the relative speed and the azimuth angle of the object. The radar measurements are performed cyclically during a period on the order of 100 ms, so that position data 14 are updated in short intervals.

A monocular video system having a video camera 16, installed in the front of the vehicle and aimed forward, and an associated image processing module 18 is provided as the second object position-finding system. Image processing module 18 analyzes the digital images recorded periodically by video camera 16 and recognizes in these images predefined object classes, e.g., vehicles, people, guide rails, road lane markings and the like. As part of example embodiments of the present invention, mainly objects that may be considered as potential obstacles, i.e., preceding vehicles (or parked vehicles), are of primary importance. For these objects, image processing module 18 supplies position data 20, including the distance, the lateral position (azimuth angle) and the lateral extent of the object (e.g., vehicle width) for each object located.

Position data 14 and 20 obtained using the various object position-finding systems are independent of one another but describe in part identical or equivalent physical variables, e.g., the object distance and the lateral position of the object, which may be calculated from the distance measured by the radar sensor and the azimuth angle.

The main part of the driver assistance system is an electronic data processing system 22, which is formed by a computer and the associated software and analyzes position data 14, 20 supplied by the two object position-finding systems. A tracking module 24 compares position data 14 supplied by radar system 10 in successive measuring cycles in a known manner to identify the objects located in one cycle using the objects located in the previous cycle and to track the movements of the objects. A ttc module 26 calculates a time to collision, which is herewith defined as $T_r$, on the basis of the radar data using the data from tracking module 24; for each object located, $T_r$ indicates the time calculated in advance which would elapse before collision of the host vehicle with the particular object, assuming that the dynamic data of the host vehicle and of the object do not change in the meantime.

It is self-evident that this time to collision is calculated primarily for objects which are within the expected driving corridor of the host vehicle, but this time to collision may also be calculated for objects situated to the side of the driving corridor by limiting the calculation to a one-dimensional analysis in which only the coordinates in the longitudinal direction of the vehicle are taken into account.

Position data 20 of the video system are also updated periodically using a period which need not necessarily be identical to the measuring period of radar sensor 10. Another tracking module 28 tracks the located video objects on the basis of position data 20 that occur periodically. By analogy with ttc module 26, another ttc module 30 is provided to calculate a time to collision $T_v$ for each video object located.

This calculation is likewise performed in the example shown here using data from associated tracking module 28 but it may optionally or additionally also be performed by using data from image processing module 18. It is also conceivable for the function of tcc module 30 to be integrated into image processing module 18 or conversely for image processing module 18 to be integrated into data processing system 22.

In a comparison module 32, measured variables $T_r$ and $T_v$, which are calculated by two ttc modules 26, 30 and are based on position data obtained independently of one another, are then compared. If these two measured variables correspond within certain limits of accuracy, then it may be assumed that the particular objects, represented on the one hand by position data 14 and on the other hand by position data 20, correspond to one and the same physical object. This information is utilized in a plausibility check module 34 for a plausibility check of radar objects tracked by tracking module 24, i.e., if correspondence between the two measured variables for the time to collision is found for a given object, this means that object position-finding with the help of radar sensor 10 has been confirmed by object position-finding with the help of the video system, thus yielding an increased certainty that the particular object is a real object.

This plausibility check may also be based on the object classification. For example, there is the problem with radar systems, in particular in locating immobile objects, that the radar echo of a real obstacle such as a stationary vehicle hardly differs from radar echoes emanating from irrelevant objects such as sewer covers or other small objects on the road surface. However, the video system will detect only the predefined object classes from the outset and will therefore ignore sewer covers and the like. Information supplied by comparison module 32 may therefore also be used for confirmation that the stationary object located by the radar sensor is a real obstacle.

Likewise, in plausibility check module 34 there may be a certain increase in the precision of the position data supplied by the radar sensor. For example, with the help of the radar sensor, the lateral extent of an object may be estimated only approximately on the basis of the strength of the radar echo and/or the distribution of the azimuth angle. A very extensive object, e.g., a preceding truck, may also generate multiple radar echoes resulting from different reflection points on the truck. It is then often difficult to decide on the basis of radar data alone whether two radar echoes belong to the same object or to different objects. If the same time to collision is thus calculated by ttc module 26 for two radar echoes, but comparison module 32 reports that the video system has located only a single object having this time to collision, then it is clear that the two radar echoes originate from the same object. In the same manner, the information about the lateral extent of the object may be made more precise in plausibility check module 34.

A plausibility check module 36 is also connected downstream from tracking module 28 for the video objects, checking the plausibility of the video objects by an analogous method when there is a match between two measured variables $T_r$ and $T_v$.

Comparison module 32 at the same time supplies a parameter TTC, which corresponds to the two matching measured variables when there is a match between two measured variables $T_r$ and $T_v$. This parameter TTC is transmitted as a "confirmed" time to collision from a TTC fusion module 38 to a PSS module 40, i.e., to the part of the driver assistance system that is responsible for the predictive safety function.

Now if the smallest of parameters TTC obtained within a measuring cycle in this way is below a threshold value defined in PSS module 40, this triggers a corresponding action by the PSS system, e.g., issue of a warning signal to the driver and/or intervention into the longitudinal guidance of the vehicle. This allows a very early issuing of the warning signal without having to wait for the results of the plausibility check procedures in plausibility check modules 34 and 36.

Parameter TTC should of course be transmitted only for objects that have been located by the two object position-finding systems within the expected driving corridor of the host vehicle. If tcc modules 26 and 30 also calculate measured variables $T_r$ and $T_v$ for objects outside of the expected driving path, then to this end a flag indicating whether the object is inside or outside the driving corridor may be transmitted together with the measured variable via comparison module 32.

In a data fusion module 42, the position data of the objects for which the plausibility check has been performed in plausibility check modules 34 and 36 and which have been made more precise, if necessary, are fused, i.e., a uniform data record is now formed for each object located, indicating the position, the relative speed, the lateral position and the lateral extent of the object. In this data fusion, the particular measuring accuracy of the object position-finding systems is taken into account. For example, the value for the object distance is determined definitively by the data of radar sensor 10, whereas the data of the video system are given a greater weight when fusing the data for this lateral position and lateral extent of the object.

On the basis of the data made more precise in this manner, a new value for parameter TTC, i.e., the time to collision, may also be calculated. Assuming a constant relative speed, this parameter TTC will be the quotient of the distance and the relative speed, which were calculated in data fusion module 42. At this stage, however, it is also possible to take into account any acceleration of the host vehicle or the located object and to extrapolate this into the future, to yield a more accurate estimate for the time to collision. In TTC fusion module 38, this more accurate value is then fused with or replaces the preliminary value supplied by comparison module 32, so that PSS module 40 is able to work with a more accurate estimate for the time to collision.

However, for the purpose of an object plausibility check in this exemplary embodiment, measured variables $T_r$ and $T_v$ are calculated only in first approximation, i.e., assuming constant speeds. Although this yields only relatively inaccurate estimates for the actual time to collision, it simplifies the calculations and yields a method that is no less sensitive than when using greater approximations for the object plausibility check.

The lateral position and lateral extent of the object are also determined with a greater accuracy in data fusion module 42, so these data may also be transmitted to the PSS module, so that, based on the more accurate data, a renewed decision may then be made in this module as to whether there is a possibility of driving around the object, and in this case, some or all of the actions provided by the PSS module may be suspended.

An example embodiment may include PSS module 40 issuing a warning to the driver as soon as a parameter TTC supplied by comparison module 32 is below the particular threshold value, but automatic interventions into the longitudinal guidance of the vehicle are made only on the basis of the more accurate data from data fusion module 42.

The more accurate position data calculated by data fusion module 42 for objects, in particular for the directly preceding vehicle, are also transmitted to an ACC module 44, which automatically regulates the distance from the preceding vehicle. In an example embodiment, ACC module 44 may also obtain position data directly from plausibility check module 34, as indicated by an arrow drawn with a dashed line in FIG. 1. In this case, the video system is used only for checking the plausibility of an object, whereas the adaptive cruise control is otherwise implemented only on the basis of the data from radar sensor 10.

Figure 2:
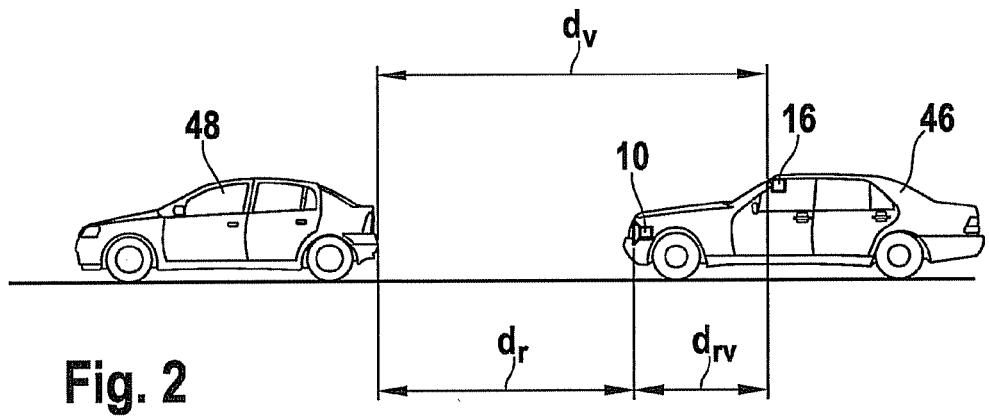
FIG. 2 shows a side view of a vehicle equipped with the driver assistance system and a preceding vehicle.

FIG. 2 shows a side view of a vehicle 46 equipped with the driver assistance system according to FIG. 1. In addition, a preceding vehicle 48 is also shown. Radar sensor 10 measures distance $d_r$ for this preceding vehicle 48. The video system measures distance $d_v$ for same vehicle 48, this distance in general being somewhat greater because video camera 16 is installed with an axial offset from radar sensor 10 in vehicle 46. The distance between radar sensor 10 and video sensor 16 in the longitudinal direction of vehicle 46 is labeled as d in FIG. 2. This distance must be taken into account in the data fusion and also in the calculation of measured variables $T_r$ and $T_v$ for the time to collision.

Figure 3:
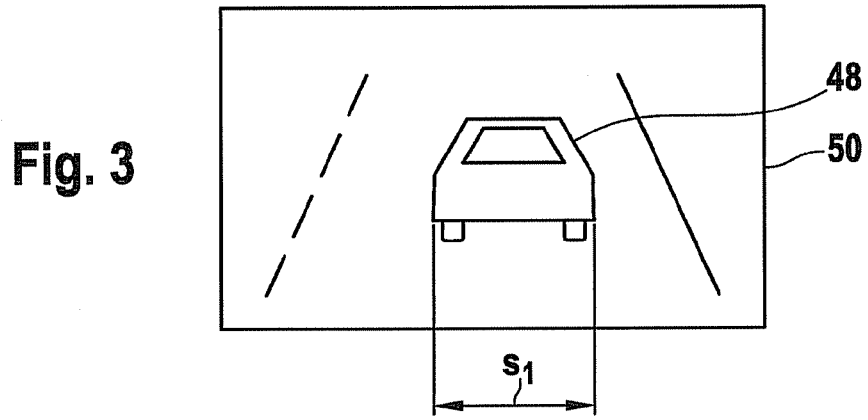
FIGS. 3 and 4 show video images of an image-based object position-finding system.
Figure 4:
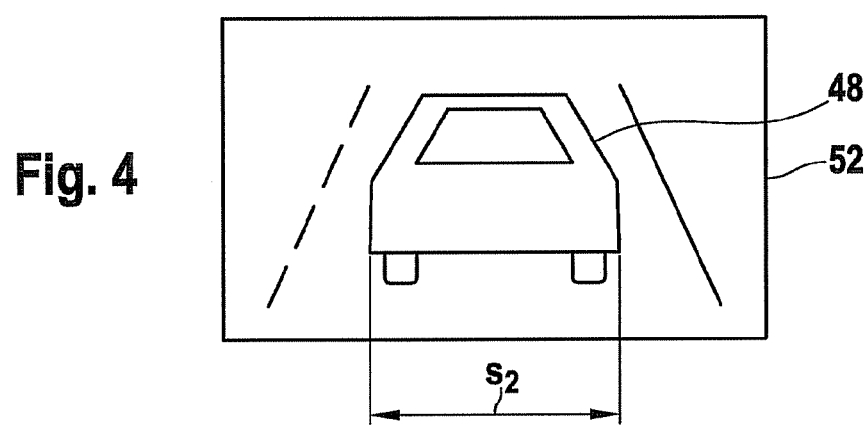
Figure 5:
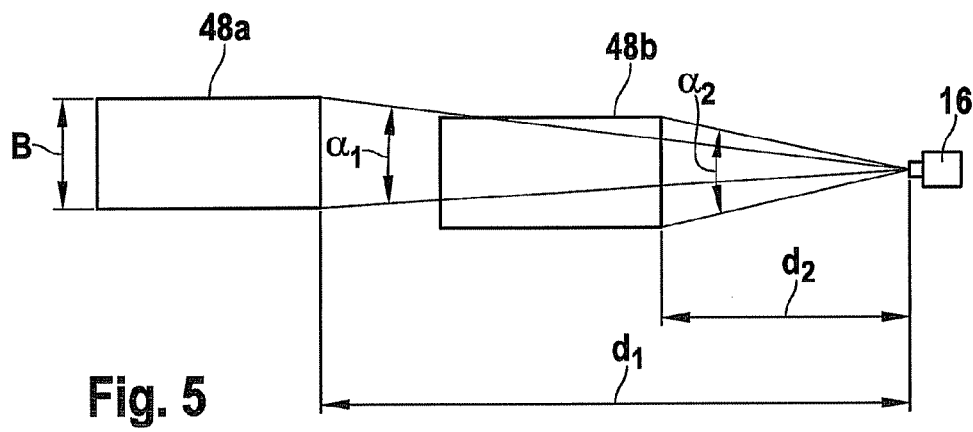
FIG. 5 shows a diagram to illustrate a method for determining a time to collision on the basis of the video images according to FIGS. 3 and 4.

On the basis of FIGS. 3 through 5, first there will now be a description of how measured variable $T_v$ for the time to collision is calculated on the basis of the data of the video system. FIG. 3 shows an image 50 recorded using video camera 16 at a certain point in time. The silhouette of preceding vehicle 48 is discernible in this image. By digital image processing, an apparent width $s_1$ of preceding vehicle 48 is extracted from this image.

FIG. 4 shows an image 52, which is recorded by video camera 16 at a somewhat later point in time, e.g., one video measuring cycle later. It is assumed here that the relative speed of vehicle 48 is negative, i.e., the distance between vehicles 48 and 46 is decreasing. The silhouette of vehicle 48 therefore appears enlarged by a certain scaling factor in image 52 because the vehicle has come closer in the meantime. In this case, the apparent width of vehicle 48 is $s_2$.

FIG. 5 shows the situation at the points in time when images 50 and 52 were recorded, shown in a schematic outline here.

The position of vehicle 48 when image 50 was recorded is labeled as 48a and the position when image 52 was recorded is labeled as 48b. Vehicle 48 has (constant) width B. In position 48a, this width B corresponds to a width angle $\alpha_1 = B/d_1$. The following thus holds for apparent width $s_1$ of vehicle 48 in image 50:

$$s_1 = k^* \alpha_1 = k^* B/d_1 \tag{1}$$

using a suitable scale constant k for image 50.

The situation is similar for position 48b:

$$s_2 = k^* \alpha_2 = k^* B/d_2 \tag{2}$$

For distances $d_1$ and $d_2$, it thus holds that:

$$d_1 = k*B/s_1 \quad (3)$$

and $$d_2 = k*B/s_2 \quad (4)$$

Measured variable $T_v$ for the time to collision should now be calculated under the simplifying assumption that video camera 16 is situated directly at the height of the leading front of vehicle 46. In addition, it should be assumed that the relative speed of vehicle 48 is constant. The number of measuring cycles still performed using video camera 16 until the collision occurs is then given by $d_2/(d_1-d_2)$. If the duration of a measuring cycle is $\Delta t$, then the following consequently holds for the time to collision:

$$T_v = \Delta t * d_2 / (d_1 - d_2) \quad (5)$$

Inserting equations (3) and (4) yields:

$$T_v = \Delta t * (k*B/s_2) / ((k*B/s_1) - (k*B/s_2)) \quad (6)$$

Both unknown constants k and B are thus shortened, and expanding with $s_1 * s_2$ yields:

$$T_v = \Delta t * s_1 / (s_2 - s_1) \quad (7)$$

The time to collision may thus be calculated directly from the change in the scaling of images 50, 52 without having to know the particular vehicle distances.

Measured variable $T_r$ for the time to collision may be calculated on the basis of the data from radar sensor 10 by simply dividing the measured distance by the measured relative speed. The traditional method for determining distance and relative speed is outlined briefly below.

Figure 6:
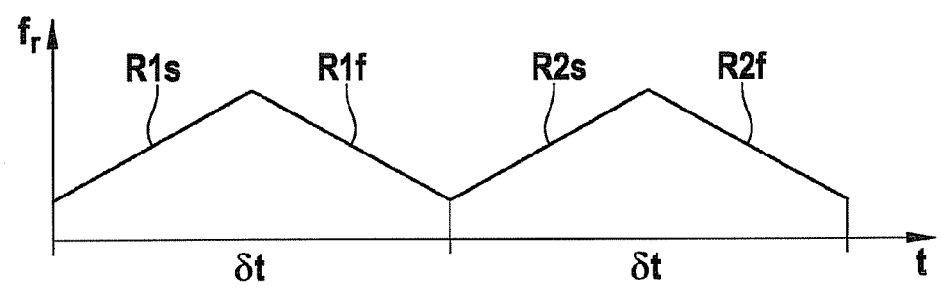
FIG. 6 shows a frequency/time diagram for an FMCW radar.

The frequency of the radar signal sent by radar sensor 10 is modulated according to a ramp, as illustrated in FIG. 6. In a first measuring cycle, the frequency increases linearly on a ramp R1$s$, then declines again linearly according to a ramp R1$f$ of the same length but at the opposite rate of change. In the next measuring cycle, this is repeated with an ascending ramp R2$s$ and a descending ramp R2$f$, etc.

The signal reflected by an object and received by the radar sensor is mixed with the signal sent by the radar sensor at this moment, yielding as a result an intermediate frequency signal having a frequency f, which is equal to the frequency difference between the signal sent and the signal received.

The intermediate frequency signal obtained on each modulation ramp is then broken down into its spectrum by fast Fourier transform. In this spectrum, each object from which a radar echo has been received is characterized by a peak at a certain frequency f. If n is the rate of change in frequency modulation, c is the speed of light, d is the distance and v is the relative speed of the object, then the following holds for frequency f:

$$f = n*2d/c + 2f_r * v/c \quad (8)$$

In the first summand, 2d/s is the transit time of the radar signal from the radar sensor to the object and back to the radar sensor. The second summand shows the Doppler shift due to the relative speed of the object.

As equation (8) indicates, the distance and relative speed cannot be determined unambiguously on the basis of a single measurement on a single frequency ramp. This yields only one relationship which these two variables must satisfy. Only when two measurements are performed, one on an ascending ramp and the other on a descending ramp, is it possible to determine v and d. If the frequencies obtained for the two ramps are added, the distance-dependent components cancel one another out (because of the change in sign of n), so relative speed v may be calculated. Conversely, if the difference between the two frequencies is formed, the Doppler components cancel one another out and distance d may be calculated.

To do so, however, it is necessary to investigate the peak caused by the same object on both ramps. If multiple objects have been located simultaneously, the allocation of the peaks to the objects is ambiguous. There is a plurality of combinations of peaks that might belong to the same object, and only some of these combinations correspond to real objects, whereas other combinations correspond to so-called spurious objects which do not exist in reality. This ambiguity may be reduced by modulating frequency $f_r$ that is sent with a third ramp having yet another ramp slope, so that an additional relationship between the relative speed and the distance of the object is obtained and then these relationships are checked for consistency. In the case of real objects, the three relationships obtained for three different ramp slopes must be satisfied by a single pair of distance and relative speed. However, even with this method, it is not possible in all cases to completely eliminate the ambiguity.

Therefore, another method is to be explained here for how measured variable $T_r$ for the time to collision may be calculated on the basis of the data from radar sensor 10 without having to determine the distance and relative speed of the object.

For distance d, relative speed v and measured variable $T_r$ for the time to collision which is sought, the following relationship holds:

$$d = v * T_r \quad (9)$$

By inserting into equation (8), this yields:

$$f = n*T_r*2v/c + 2f_r*v/c \quad (10)$$
$$= (2v/c)*(n*T_r + f_r)$$

If it is again assumed that relative speed v is constant and frequencies $f_1$ and $f_2$ are considered, which are obtained in two successive modulation ramps having the same slope, e.g., from ramps R1$s$ and R2$s$, then the corresponding equations (10) for the two measurements differ only in that the time to collision has changed by period $\delta t$ of a single measuring cycle.

$$f_1 = (2v/c)*(n*T_r + f_r) \quad (11)$$

$$f_2 = (2v/c)*(n*(T_r - \delta t) + f_r) \quad (12)$$

For difference $\Delta f = f1 - f2$, it thus holds that:

$$\Delta f = (2v/c)*n*\delta t \quad (13)$$

For relative speed v, this yields:

$$v = (c/2n)*(\Delta f/\delta t) \quad (14)$$

When this is inserted into equation (11), it yields $$f_1 = (\Delta f/n*\delta t)*(n*T_r + f_r) \quad (15)$$

and consequently:

$$T_r = (\delta t * f_1 / \Delta f) - (f_r / n) \quad (16)$$

By a corresponding method, measured variable $T_r$ may also be determined on descending ramps R1$f$ and R2$f$. Ramp slope n then has the opposite sign.

Thus, a time to collision may be calculated for each individual peak in the spectrum of the intermediate frequency signal, without having to calculate the distance of the particular object. This avoids the problems associated with uncertainty in object assignment because only the spectra obtained on ramps of the same ramp slope are investigated in each case. In this case, the identification of the peaks obtained in the current measuring cycle, this identification being performed in tracking module 24, is unproblematical with the peaks obtained in the previous cycle because the distance and relative speed and thus the location of the peak from one measuring cycle to the next will change very little.

In comparison module 32, measured variables $T_r$ and $T_v$ which are obtained independently of one another are compared. Depending on the desired accuracy, the influence of distance $d_r$ (FIG. 2) between radar sensor 10 and video camera 16 may also have to be taken into account, if necessary. To standardize measured variable $T_r$ with respect to distance $d_{rv}$, relative speed v of the object is needed, and may be obtained from equation (14), for example. The following equation holds for measured variable $T_{norm}$ which has been standardized to distance $d_{rv}$ and consequently is comparable to measured variable $T_v$:

$$T_{norm} = T_r + d_{rv}/v \qquad (17)$$

If measured variable $T_{norm}$ standardized and calculated in this way matches measured variable $T_v$, then the plausibility of the object has been checked.

Figure 7:
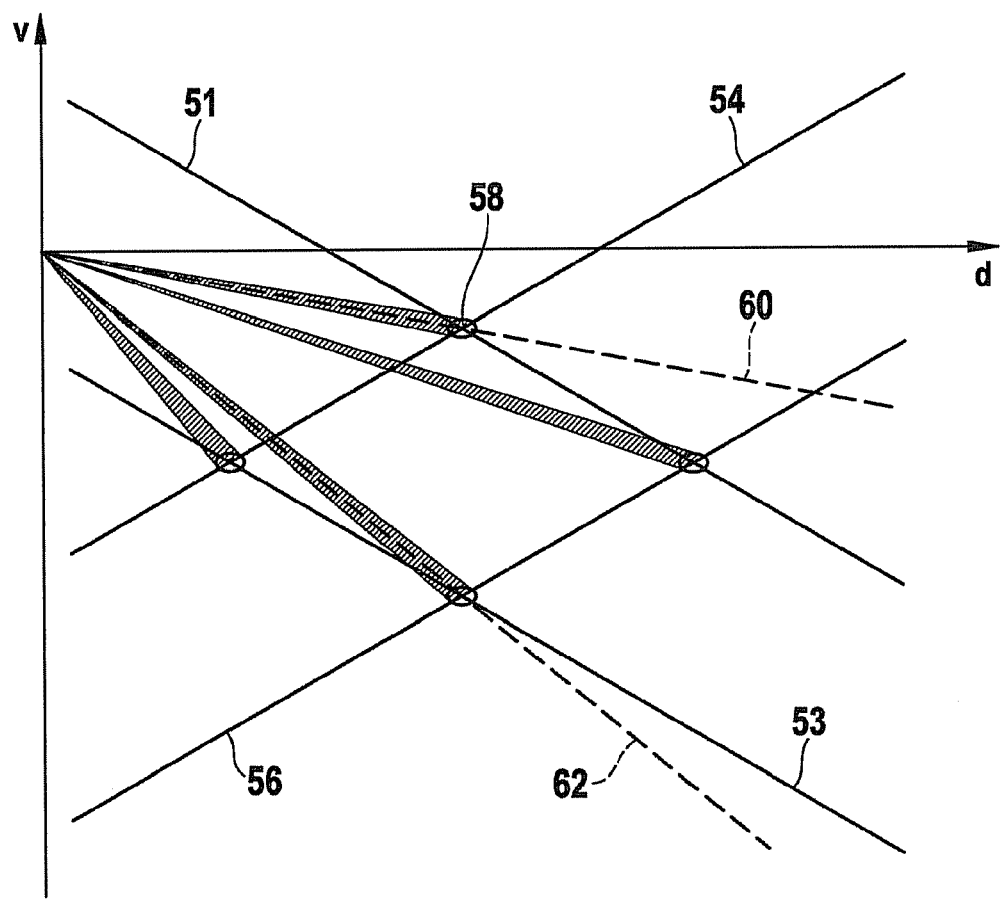
FIG. 7 shows a v/d diagram to illustrate relationships between the distances and relative speeds of located objects which are utilized in the method according to example embodiments of the present invention.

With reference to FIG. 7, a modified method will now be explained; with this method it is possible to check the plausibility of objects with the help of the time to collision and solve the problem of "spurious objects" at the time of the radar position-finding. As an example, it shall be assumed that two objects are located by radar sensor 10 and also by the video system.

In the analysis of the radar data, two peaks are thus obtained on ascending ramp R1s in FIG. 6 and two additional peaks for the same objects are obtained on descending ramp R1f. The frequency of each of these peaks defines the relationship between relative speed v and distance d of the object according to equation (8). These relationships may be represented as straight lines 51, 53, 54 and 56 in a v/d diagram according to FIG. 7. Two descending lines 51 and 53 correspond to the peaks recorded on ramp R1s (positive n) and two descending straight lines 54 and 56 correspond to the peaks recorded on descending ramp R1f (negative n). The distance and relative speed data of an object must be on one of the descending straight lines as well as on one of the ascending straight lines.

As FIG. 7 shows, four straight lines 51-56 form four points of intersection, which might represent possible object data. The points of intersection are plotted as "error ellipses" 58 in FIG. 7, which in each case indicates the measuring inaccuracy with regard to the measurement of distance and speed. Only two of these points of intersection correspond to real objects, whereas the other two points of intersection are spurious objects. The problem is to identify the two real objects among these four possible objects.

Each of the four points of intersection also implicitly defines a particular measured variable $T_r$ for the time to collision using equation (9), namely the slope of a straight line running from the origin of coordinates (d=0, v=0) to the particular point of intersection. Each error ellipse 58 together with the origin of coordinates spans a triangle which indicates the tolerance limits for the slope of the straight line and thus the time to collision.

Since the two objects are also located by the video system, this also yields two measured variables $T_v$ according to equation (7), and straight lines 60 and 62 defined by these measured variables are also plotted in FIG. 7. These straight lines pass through associated error ellipses 58 only for the two real objects. Thus the plausibility of objects belonging to the corresponding points of intersection as real objects has been checked and consequently the objects at the other points of intersection must be spurious objects.

The influence of distance $d_{rv}$ between the radar sensor and the video camera may be taken into account easily in this method by shifting particular error ellipses 58 by this distance on the d axis.

What is claimed is:

1. A method for checking plausibility of objects in driver assistance systems for motor vehicles, comprising:
    deriving two measured variables from position data from two object position-finding systems of the vehicle that operate independently of one another for an object located by the two position-finding systems, one variable for each position-finding system, these variables representing one and the same physical parameter; and
    checking the two measured variables for consistency;
    wherein the parameter is a time to collision of the vehicle with the object, which is calculated in advance.

2. The method according to claim 1, wherein one of the two position-finding systems is a video-based system, and the associated measured variable is calculated directly from a change in a spurious object size in two video images recorded at different times.

3. The method according to claim 1, wherein one of the two object position-finding systems is an FMCW radar.

4. The method according to claim 3, wherein the measured variable assigned to the FMCW radar is calculated on the basis of a change in a frequency of radar signals received from the object, the signals being measured in different measuring cycles of the radar sensor for frequency ramps having a same ramp slope.

5. The method according to claim 3, wherein a relationship is determined between a relative speed and a distance of the object represented by a straight line in a v/d diagram for each object located by the FMCW radar on the basis of a signal obtained on a modulation ramp; another relationship is determined for each object on the basis of a signal obtained on another modulation ramp having another ramp slope, the relationship being represented by another straight line in the v/d diagram; a measured variable is calculated for each point of intersection of the straight lines, and the measured variables are compared with the measured variables obtained by a video-based position-finding system.

6. The method according to claim 1, wherein, for the comparison, one of the two measured variables is corrected by an effect of a distance between the sensors of the two object position-finding systems in a longitudinal direction of the vehicle.

* * * * *

UNITED STATES PATENT AND TRADEMARK OFFICE
CERTIFICATE OF CORRECTION

| | | |
|---|---|---|
| PATENT NO. | : 8,125,372 B2 | Page 1 of 1 |
| APPLICATION NO. | : 12/305432 | |
| DATED | : February 28, 2012 | |
| INVENTOR(S) | : Focke et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 59 days.

On the face of the patent, (86) "§ 371(c)(1), (2), (4) Date: change "Dec. 4, 2009" to --§ 371(c)(1), (2), (4) Date: Jul. 22, 2011--.

Signed and Sealed this
Fifteenth Day of May, 2012

David J. Kappos
*Director of the United States Patent and Trademark Office*